Figure 1:
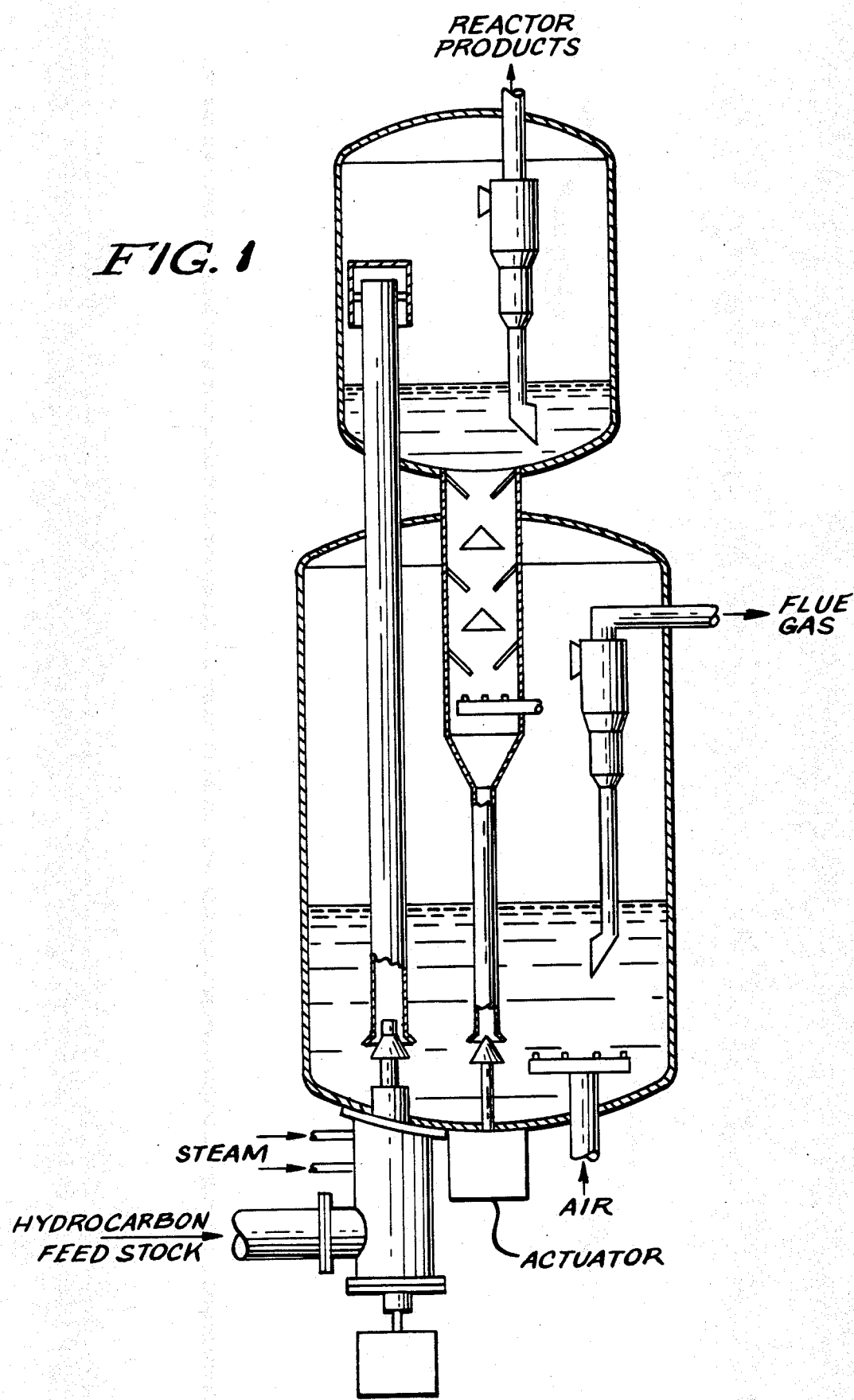

United States Patent [19]

Cartmell et al.

[11] Patent Number: 4,808,382

[45] Date of Patent: Feb. 28, 1989

[54] PROCESS FOR MIXING CRACKING CATALYST WITH A FLUID HYDROCARBON

[75] Inventors: Robert R. Cartmell, Crown Point, Ind.; Carl J. Horecky, Elmhurst, Ill.

[73] Assignee: Amoco Corporation, Chicago, Ill.

[21] Appl. No.: 90,534

[22] Filed: Aug. 28, 1987

Related U.S. Application Data

[62] Division of Ser. No. 934,746, Nov. 25, 1986, Pat. No. 4,711,766, which is a division of Ser. No. 629,070, Jul. 9, 1984, Pat. No. 4,624,836.

[51] Int. Cl.$^4$ .................. F27B 15/08; F27B 15/02; B01J 8/08; G65D 7/00
[52] U.S. Cl. ................................ 422/140; 422/145; 422/110; 422/111; 422/214; 208/157
[58] Field of Search ............... 422/139, 140, 142, 144, 422/145, 147, 214, 110, 111; 208/127, 153, 157; 351/319

[56] References Cited

U.S. PATENT DOCUMENTS

| 2,668,755 | 11/1923 | Kershaw et al. | 422/139 |
| 2,850,364 | 2/1954 | Dowling | 422/142 X |
| 3,152,065 | 10/1964 | Sharp et al. | 422/214 X |

Primary Examiner—Barry S. Richman
Assistant Examiner—Amalia L. Santiago
Attorney, Agent, or Firm—Ekkehard Schoettle; William H. Magidson; Ralph C. Medhurst

[57] ABSTRACT

The present invention relates to a process for immediately and intimately mixing a fluidizable cracking catalyst with a fluid hydrocarbon in a riser reactor. The process involves passing the hydrocarbon through a hollow plug valve engageable with the upstream end of a riser reactor. The hydrocarbon is atomized by a nozzle attached to the downstream end of the hollow plug valve. The plug valve is capable of moving in a reciprocating fashion to permit the flow of catalyst to the riser.

4 Claims, 3 Drawing Sheets

FIG. 3
FIG. 4
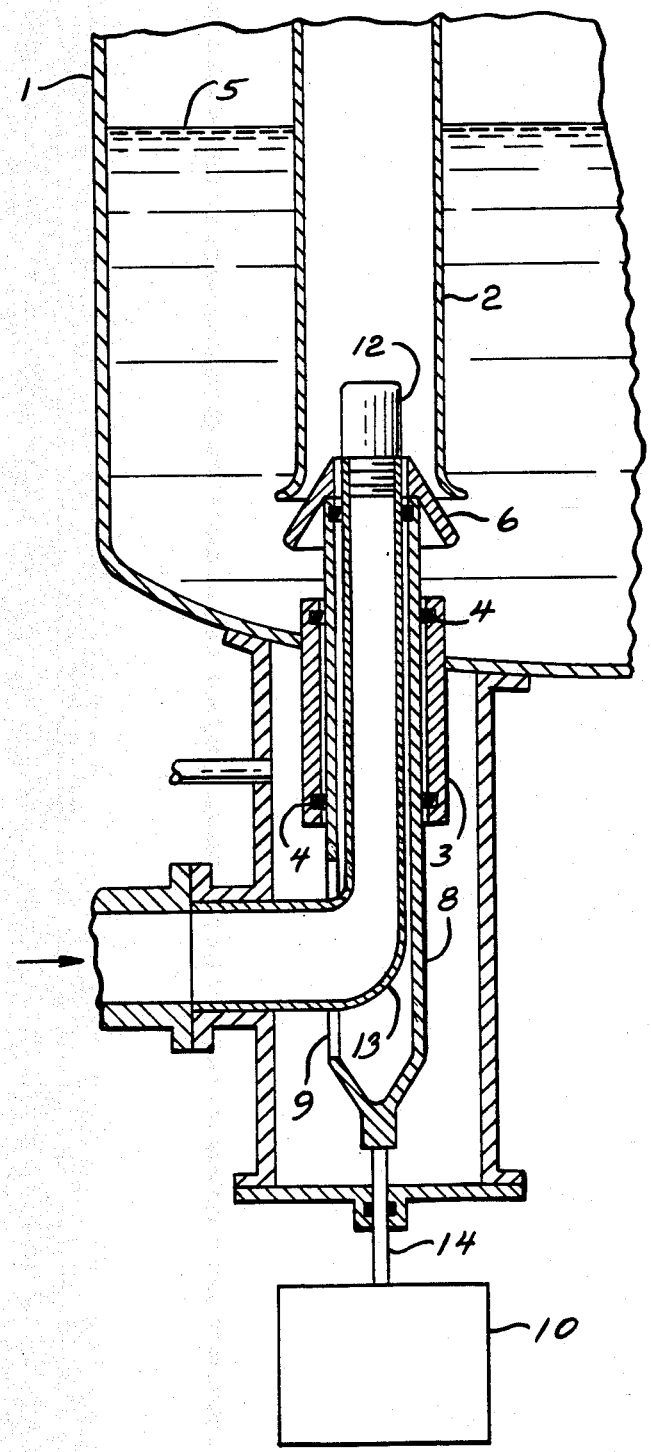
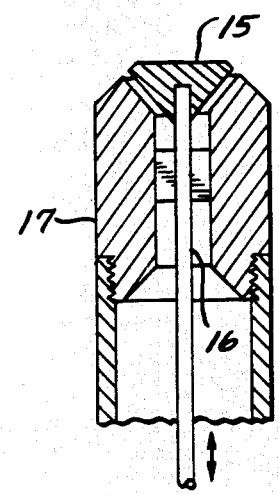

PROCESS FOR MIXING CRACKING CATALYST WITH A FLUID HYDROCARBON

CROSS-REFERENCE TO RELATED APPLICATIONS

This application is a division of U.S. Ser. No. 934,746 now U.S. Pat. No. 4,711,766, filed on Nov. 25, 1986, which in turn is a Divisional of Ser. No. 629,070 now U.S. Pat. No. 4,624,836 filed July 9, 1984.

The present invention relates to an improved apparatus and process for carrying out the immediate and intimate mixing of cracking catalyst with a fluid hydrocarbon feedstock in a riser reactor.

More particularly, the present invention relates to an apparatus and process for the mixing of cracking catalyst and hydrocarbon feedstock in a riser reactor wherein a plug valve is employed to mix the catalyst with the feedstock.

One of the problems associated with fluidized catalytic cracking in a riser reactor involves the short residence time in the riser reactor and the reactor's injection or feed system's inability to mix the cracking catalyst with the hydrocarbon feedstock rapidly and uniformly. In modern fluid catalytic cracking units, the cracking reaction is effected by introducing the hydrocarbon feedstock at the lower, or upstream, end of a riser reactor conversion zone together with hot fluidized catalyst particulates. The hot catalyst supplies all or a major proportion of the heat to vaporize the feedstock and to carry out the endothermic cracking reaction.

The vaporized feedstock and catalyst pass up the riser reactor together at high superficial velocities. Because of the high activity of the catalyst, the cracking reaction has generally proceeded to the desired extent at the upper, or downstream, end of the riser reactor. The cracked hydrocarbons are then separated from the catalyst in a disengaging vessel and are sent downstream for further processing. The catalyst is, in turn, stripped with an inert gas such as steam to remove entrained hydrocarbons before being sent to a regenerating zone for removal of the coke which accumulates on the catalyst during the cracking process. The regenerated cracking catalyst is then introduced into the riser reactor. FIG. 1 shows one particular design of a fluidized catalytic cracking unit as discussed above.

Due to the extremely short contact times between the hydrocarbon feedstock and the fluidized catalyst particulates in the riser reactor, it is highly desirable to achieve immediate and intimate mixing of the hydrocarbon feedstock and catalyst particulates in order to achieve more uniform conversion of the hydrocarbon within the confines of the riser reactor conversion zone.

It is known that improved mixing reduces undesirable gas make, increases gasoline selectivity, improves the effect of catalytic cracking in preference to thermal cracking and reduces carbon formation.

Further, as refiners have perceived the need to blend heavier feedstocks, e.g., resids, with the typical fluidized catalytic cracking hydrocarbon feedstock due to economic incentives or supply constraints, the necessity of obtaining intimate and immediate mixing of catalyst particulates and hydrocarbon feedstock has become even more important. Specifically, heavier fractions of the heavier hydrocarbon feedstock are not as readily vaporized in the riser reactor upon contact with the hot catalyst. Such non-vaporized components do not facilitate the desired intimate contact between catalyst particulates and feed. Liquid wetting of the catalyst particulates reduces the surface area available to catalyze the desired hydrocarbon reactions and results in increased coke formation due to adsorption of the heavy fractions present in the feed or formed by polymerization. Consequently the process duties of the catalyst stripper and regenerator are increased. Liquid droplets and wet catalyst particulates may also deleteriously deposit as coke on the walls of the riser reactor.

Accordingly, within the context of a short residence time fluidized catalytic cracking process, the feed injection system's ability to effect immediate and intimate mixing of catalyst particulates and hydrocarbon feedstock coupled with the rapid vaporization of the hydrocarbon feedstock is of paramount concern. The rate of hydrocarbon feedstock vaporization in the riser reactor is, of course, increased by increasing the degree of atomization of the hydrocarbon feedstock charged to the riser reactor.

Certain previous attempts to effect the intimate mixing of catalyst particulates and hydrocarbon feedstocks coupled with the rapid vaporization of the hydrocarbon feedstock have included the use of steam or water as an atomization medium.

U.S. Pat. No. 3,812,029 (P. W. Snyder, Jr.) discloses a riser reactor oil injector device wherein an inner tube terminating in a nozzle is used to convey easily coked oil and a concentric outer tube terminating in a nozzle forward of the inner tube nozzle is used to pass water.

U.S. Pat. No. 3,152,065 (R. M. Sharp et al.) discloses a riser reactor feed injector arrangement which includes an inner pipe for passing steam and an outer pipe forming an annulus with the inner pipe through which oil is passed. The subject reference also discloses the placement of curved stator blades in the annulus adjacent to the end of the steam pipe to improve mixing.

U.S. Pat. No. 3,654,140 (J. Griffel et al.) is directed to an oil feed injector design concurrently feeding steam to an injection zone in a volumetric ratio of steam to liquid hydrocarbon ranging from about 3 to 75 thereby imparting to the mixture an exit velocity relative to the catalyst particles of at least about 100 feet per second whereby the oil feed is substantially completely atomized at the nozzle exit forming droplets less than about 350 microns in diameter.

U.S. Pat. No. 4,405,444 (O. J. Zandona) is directed to an oil injection concept wherein the hydrocarbon liquid is foamed prior to mixing with fluidizable solids in a riser reactor.

None of the above discussed injection systems however utilize a plug valve to mix cracking catalyst and fluid hydrocarbon feedstock in a riser reactor.

U.S. Pat. No. 2,850,364 (E. D. Dowling) shows a hollow plug type control valve for controlling the flow of fluidized particulates to a conduit and mixing the same with a fluid charge stock. The reference plug valve does not disclose a means for effecting the atomization of the fluid charge stock. It is suggested that steam may be admixed with the fluid charge prior to passing the charge stock to the plug valve.

The practice of commingling steam with the hydrocarbon feedstock at a point remote from the discharge into the riser reactor in order to effect atomization of the hydrocarbon feedstock has not been found to be satisfactory. In particular, the hydrocarbon feedstock flow to the riser reactor tends to pulsate. This is due to steam bubbles forming in the hydrocarbon feedstock causing the hydrocarbon feedstock to enter the riser in a slug flow regime rather than in the desired atomized or mist flow regime.

Finally, U.S. Pat. No. 2,606,097 (L. B. Goodson et al.) discloses an apparatus whereby finely divided solid catalyst material and gases or vapors may be intimately contacted. Specifically, the pertinent portion of the reference apparatus comprises a fluid injector means situated below and protruding into the upstream inlet of a riser reactor. The injector means may comprise a nozzle. The flow of vapors through the injector means draws finely divided catalyst material from the bottom of a chamber situated outside the injector means and riser reactor. The size of the annular opening communicating between the riser reactor and the chamber containing the catalyst is constant. Thus, in contrast to a plug valve the subject apparatus does not provide a means for controlling the flow of catalyst material independent of the flow of vapor to the riser reactor.

The apparatus and process of the present invention does not rely upon the use of steam or water as a hydrocarbon feedstock atomization medium and judiciously employs a mechanically atomizing nozzle in connection with a plug valve. The apparatus and process of the present invention incorporating an atomizing nozzle permits the degree of atomization to be precisely controlled by varying the pressure gradient across the nozzle while concomitantly controlling the flow of fluidizable cracking catalyst to be admixed with the atomized feedstock to a riser reactor. Further, even if an atomization medium such as steam is employed, the atomizing nozzle serves to reinstitute an atomized flow regime if the detrimental slug flow regime has been established, prior to introduction of the feedstock into the riser reactor.

Accordingly, the present invention relates to an apparatus and process for effecting the immediate and intimate mixing between fluidizable cracking catalyst and a fluid hydrocarbon feedstock in a riser reactor.

In one embodiment the invention apparatus comprises a riser reactor situated in a chamber containing cracking catalyst with a hollow stem plug valve in axial alignment with the upstream access opening of the riser reactor. The plug valve comprises a generally hollow tubular plug stem with a hollow plug secured thereto. The plug is engageable with the riser reactor access opening and movable in a reciprocating fashion to permit and control the flow of fluidizable cracking catalyst to the riser reactor. The plug valve has a nozzle means fixedly attached at the downstream end of the plug valve which serves to atomize fluid feedstock to the riser reactor passed through the plug valve.

In another embodiment the invention apparatus comprises a riser reactor situated in a chamber containing cracking catalyst having a stationary feed tube extending into the upstream access opening of the riser reactor. The feed tube has a nozzle means fixedly attached which serves to atomize fluid charge stock injected into the riser reactor. The apparatus further comprises a plug valve having a generally upright tubular valve stem positioned concentrically and externally around a portion of the feed tube iith a hollow plug secured to the valve stem. The plug valve is movable in a reciprocating fashion from a closed position for blocking the riser reactor access opening to an open position for permitting and controlling the flow of fluidizable crcking catalyst through the access opening into the riser reactor in order to mix with the fluid feedstock atomized by the above-mentioned nozzle. The degree of atomization is controlled by varying the pressure drop across the nozzle or the nozzle design.

In yet another embodiment, the present invention relates to a process for immediately and intimately mixing a fluidizable cracking catalyst with a fluid hydrocarbon in a riser reactor situated within a chamber containing the cracking catalyst. Specifically, the fluid hydrocarbon feedstock is passed through a hollow plug valve having a hollow plug secured thereto which is engageable with the access opening to the riser reactor. The plug valve is retracted from the access opening and moved in a reciprocating fashion to permit and control the flow of cracking catalyst to the riser reactor from the chamber. The fluid hydrocarbon is atomized by a nozzle means secured to the plug valve upon entering the upstream end of the riser reactor. The atomized feedstock entering the riser reactor draws or aspirates the cracking catalyst into the riser reactor, thereby mixing with the catalyst in the riser reactor.

Figure 2:
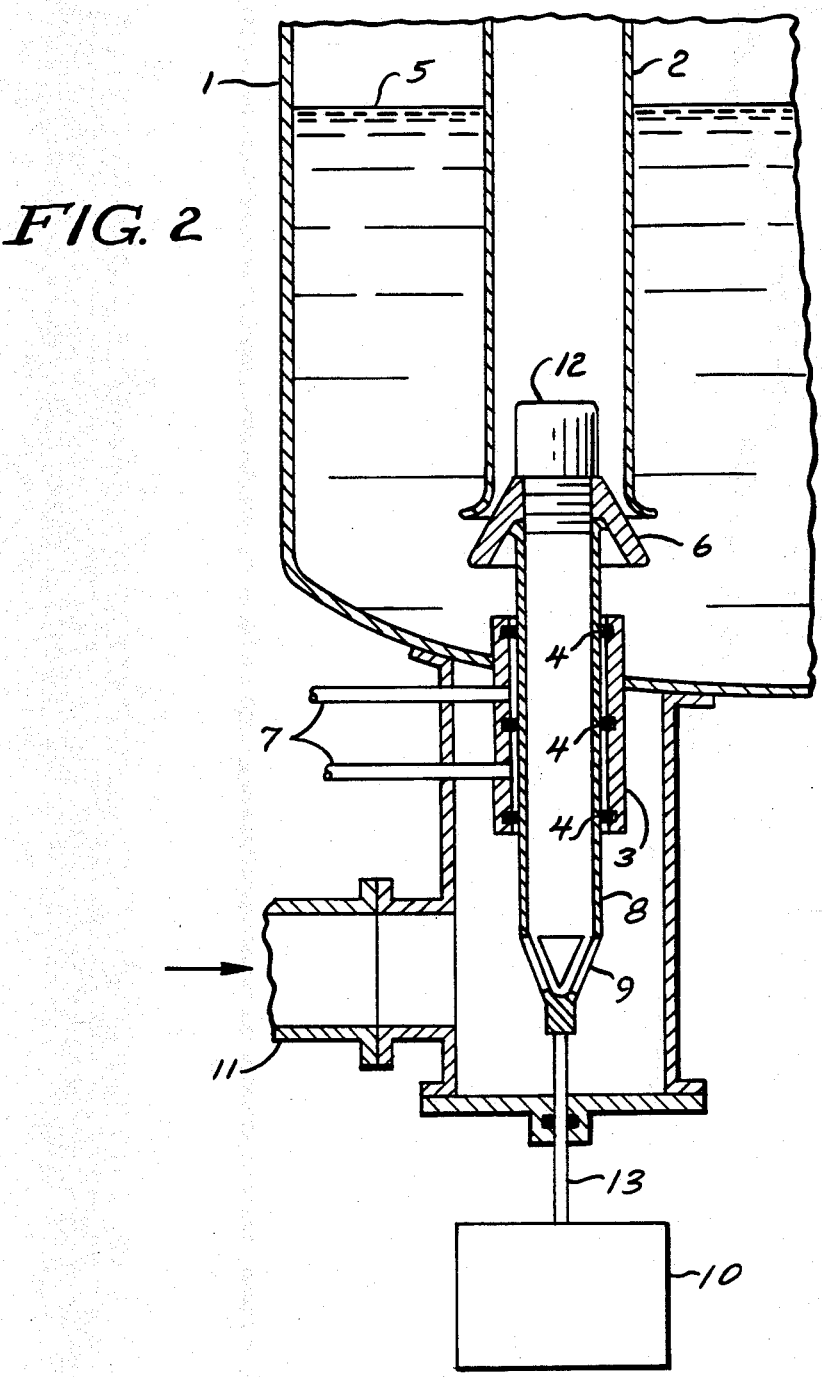

The invention can best be understood by reference to the drawings. FIG. 2 illustrates a portion of a regenerator having a riser reactor disposed therein in a similar configuration as the entire FCC unit depicted in FIG. 1.

Specifically, hydrocarbon feedstock enters conduit 11, which is in open communication with plug stem tube 8, and passes upwards through plug stem tube 8. Plug stem tube 8 protrudes into riser reactor 2 at its upstream access opening. Plug stem tube 8 is attached to actuating means 10 at its lower end via spider 9 and plug stem rod 13. Actuating means 10 serves to downwardly retract plug 6 from the upstream access opening to riser reactor 2 in order to admit fluidizable catalyst particulates from bed 5 located in regenerator 1. The actuating means may be driven by pneumatic, electrical, hydraulic, or other motor control means. As plug 6 is withdrawn from the riser reactor upstream access opening, fluidizable cracking catalyst particulates are aspirated into riser reactor 2 by the flow of hydrocarbon into riser reactor 2. Plug 6 has nozzle means 12 fixedly attached thereto which serves to mechanically atomize the hydrocarbon feedstock passed to the riser reactor.

The plug valve comprising plug stem tube 8 and hollow plug 6 and nozzle means 12 serve to inject and atomize hydrocarbon feedstock and optionally an atomization medium into riser reactor 2 while concomitantly controlling the flow of cracking catalyst to the riser reactor.

In order to prevent hydrocarbon feedstock from leaking into the annular area between guide tube 3 and plug stem tube 8, steam or some other suitable bleed medium is passed via conduit 7 into the annular area and allowed to bleed past seal bushings 4. The subject steam bleed similarly prevents fluidizable cracking catalyst particulates from passing into the annular area from bed 5, and scoring the plug stem tube.

In another embodiment of the present invention, there is afforded greater operational flexibility in the use of a nozzle means to atomize the hydrocarbon feedstock charged to the riser reactor. In particular, nozzles require greater pressure drops to effect the desired atomization, especially if heavier feedstocks are charged therethrough. If however, the pressure in the hydrocarbon feed stream is increased to accommodate the nozzle and achieve greater atomization, the bleed steam pressure must in turn be increased in order to prevent the hydrocarbon feedstock from passing into the annular area between the guide tube and plug stem tube and forming coke therein. As the bleed steam pressure is increased an undesirable, inordinate amount of steam is passed to the fluidizable catalyst particulates in the regenerator. Thus, the pressure range within which feedstock may be passed to the plug stem tube is limited if an atomizing nozzle is to be employed.

FIG. 3 depicts the same portion of a regenerator and riser reactor as shown in FIG. 2 except that the pressure drop across the nozzle means may be increased without a concomitant increase in the bleed steam pressure. In the present embodiment, a stationary feed tube 13 is employed which does not simultaneously serve as a movable plug stem tube. In FIG. 3, plug stem tube 8, fixedly secured to plug 6, is movable in the annular area between guide tube 3 and feed tube 13.

Plug stem tube 8 is moved by actuating means 10 in a reciprocating fashion from a closed position blocking the access opening to riser reactor 2 to an open position permitting and controlling the flow of fluidizable catalyst particulates from bed 5 to riser reactor 2. Actuating means 10 is connected to plug stem tube 8 via plug stem rod 14 and yoke means 9.

Yoke means 9 may suitably comprise elongated slots through which horizontal conduit 11 passes, these slots permitting the reciprocating movement of plug stem tube 8.

Stationary feed tube 13 has nozzle 12 secured to it in order to effect mechanical atomization of the hydrocarbon feedstock. Any desired degree of atomization may be achieved by varying the pressure drop across nozzle 12. In the invention apparatus, the pressure of the hydrocarbon feedstock in feed tube 13 may be increased to any desired value as the feed tube is entirely enclosed from the plug stem tube thereby not creating an annular region wherein hydrocarbon feedstock may pass to as in the apparatus shown in FIG. 2. Consequently, the pressure of bleed steam entering conduit 7 need not be increased in order to compensate for any increase in hydrocarbon feedstock pressure in feed tube 13 calculated to utilize nozzle 12.

The invention apparatus, by virtue of nozzle 12, does not require the use of atomizing steam and the attendant mixing difficulties associated therewith described above.

In the event an atomizing medium is introduced, for instance when the feed rate is below the design rate, the nozzle will atomize the hydrocarbon-atomizing medium mixture.

FIG. 4 shows another embodiment of the present invention wherein the atomizing nozzle comprises a variable orifice permitting pressure drop variation across the nozzle in response to variable feed rates. The discharge orifice of nozzle 17 is varied by the reciprocating movement of frustrum 15 which is fixedly attached to control rod 16.

Not shown in the accompanying figures are protective shrouds which can be associated with the nozzle means and the plug stem tube, which shrouds serve to protect the nozzle means and plug stem tube from the abrasive catalyst particulate environment prevailing in the regenerator.

Also, the invention apparatus in the present embodiment effects a high degree of atomization and hence more intimate and immediate mixing of the fluidizable catalyst particles with hydrocarbon feedstock without requiring increased bleed steam pressure.

It should be noted that the invention apparatus may be employed to facilitate the intimacy and immediacy of the contact between a hydrocarbon feedstock and fluidizable particulates which particulates may be catalytic or non-catalytic.

When the fluidizable particulates used in the invention constitute cracking catalyst, the cracking catalyst which is suitable in this invention includes high-activity solids having a size not greater than about 100 microns. Preferably, the major proportion of cracking catalyst is in the size range of about 40 to 80 microns. Suitable catalysts include those of the amorphous type such as silica, alumina, magnesia, boria, and mixtures thereof. The preferred catalysts include those comprising a molecular sieve component such as crystalline aluminosilicates or crystalline borosilicates.

The fluid charge stock streams which are suitable in this invention include liquids and gases which may or may not include entrained or dispersed solids. Hydrocarbon feedstocks are especially useful fluid streams. The term "hydrocarbon feedstock" is intended to include petroleum fractions such as naphthas, distillates, gas oils, and residual oils; shale oils; oils from tar sands; oils from coal liquefaction; and the like.

When a hydrocarbon feedstock is used as the fluid stream, the feedstock and the cracking catalyst preferably pass up the riser reactor at cracking conditions, i.e., at a temperature of about 800° to 1100° F.; at a weight-hourly space velocity of about 2 to 200; at a catalyst-to-hydrocarbon weight ratio of about 2 to 20 so that the fluidized dispersion has a density of about 1 to 40 lbs/ft$^3$; and a fluidizing velocity of about 10 to 150 ft/sec. Under these conditions the conversion level varies from about 40 to 100 percent where conversion is defined as the percentage reduction of hydrocarbons boiling above 430° F.

Further, the apparatus of the invention is not limited to the configuration as depicted n FIGS. 2 and 3 wherein the riser reactor passes throuqh the regenerator. The riser reactor may pass through any type of collection vessel or chamber that contains a bed of fluidizable particulates wherein particulate flow to the riser reactor is controlled by a hollow stem plug valve.

The mechanically atomizing nozzle suitable for use in the present invention may be any type generally known to the art. For instance, The Spraying Systems Co. Fulljet Nozzles Distribojet series, which nozzles produce a full cone spray pattern are amenable to use in the present invention. The spray angles for these particular nozzles range from 50° to 95°. Those skilled in the art will readily be able to select the proper material of construction, pressure drop, and design that comports with the process environment contemplated by the present invention.

Preferred pressure drops through the nozzle means range from about 10 to about 50 psi, for the embodiment of the invention depicted in FIG. 2, wherein bleed stream is used to prevent feedstock from passing into the annular area between the plug stem tube and the guide tube. Where the stationary feed tube as depicted in FIG. 3 is employed, substantially higher pressure drops across the nozzle may be used, ranging from about 10 to about 300 psi. The higher pressure drops are especially useful in atomizing heavier feedstocks such as resids.

While the above discussion is confined to a fluidized catalytic cracking application of the present invention, it should be noted that the present invention is capable of various applications in the chemical and petroleum refining arts.

What is claimed is:

1. A process for immediately and intimately mixing a fluidizable cracking catalyst with a fluid hydrocarbon in a riser reactor situated within a chamber containing said cracking catalyst comprising the steps of:
   (a) passing a fluid hydrocarbon feedstock through a plug valve having: (i) a generally upright tubular valve stem, adapted to carry the feedstock (ii) a hollow plug secured to said valve stem which is engageable with a means defining an access opening at the upstream end of said riser reactor;
   (b) retracting said plug valve from said means defining an access opening and aspirating said catalyst into said riser by the flow of the hydrocarbon feedstock into the riser, and moving said plug valve in a reciprocating fashion to permit and control the flow of the cracking catalyst from said chamber to said access opening into said riser reactor;
   (c) atomizing the fluid hydrocarbon feedstock through a nozzle means secured to said plug valve prior to passing the feedstock to the riser reactor and mixing with the cracking catalyst; and
   (d) passing a bleed medium through a first bleed medium conduit into an upper annular compartment defined by a stationary guide tube positioned concentrically and externally around a portion of said tubular valve stem and through a second bleed medium conduit into a lower annular compartment defined by said stationary guide tube positioned concentrically and externally around a portion of said tubular valve stem wherein said annular compartments are separated by at least one bushing, and wherein said upper annular compartment is bounded at its upper end by an upper bushing, wherein said lower annular comartment is bounded at its lower end by a lower bushing.

2. The procsss of claim 1 wherein said nozzle means produces a conical spray pattern.

3. The process of claim 1 wherein the pressure drop across said nozzle means varies from about 10 to about 300 psi.

4. The process of claim 1 wherein the pressure drop across said nozzle means varies from about 10 to about 50 psi.

* * * * *